US011926158B2

(12) United States Patent
Ueda

(10) Patent No.: US 11,926,158 B2
(45) Date of Patent: Mar. 12, 2024

(54) INKJET RECORDING APPARATUS

(71) Applicant: KYOCERA Document Solutions Inc., Osaka (JP)

(72) Inventor: Hiroyuki Ueda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 71 days.

(21) Appl. No.: 17/699,987

(22) Filed: Mar. 21, 2022

(65) Prior Publication Data

US 2022/0314624 A1 Oct. 6, 2022

(30) Foreign Application Priority Data

Mar. 30, 2021 (JP) ................................ 2021-057925

(51) Int. Cl.
*B41J 2/165* (2006.01)
*B41J 11/00* (2006.01)

(52) U.S. Cl.
CPC ....... *B41J 2/16523* (2013.01); *B41J 2/16532* (2013.01); *B41J 11/007* (2013.01); *B41J 11/0085* (2013.01)

(58) Field of Classification Search
CPC .. B41J 2/16523; B41J 2/16532; B41J 11/007; B41J 11/0085
See application file for complete search history.

(56) References Cited

U.S. PATENT DOCUMENTS 11,731,429 B2 * 8/2023 Ueda ...................... B41J 11/007 347/85
2021/0155001 A1 * 5/2021 Yamashita ............. B41J 2/1721

FOREIGN PATENT DOCUMENTS

EP 1502748 A1 * 2/2005 .......... B41J 2/16523
JP 2010-23374 A 2/2010

* cited by examiner

*Primary Examiner* — Sharon Polk
(74) *Attorney, Agent, or Firm* — Stein IP LLC

(57) ABSTRACT

The inkjet recording apparatus includes a recording head, a first conveyor belt, and an ink receiving part. The ink receiving part includes a discharge port, a liquid-absorptive rotator, and a counter member. The discharge port is placed at an end portion in a crossing direction crossing a recording-medium conveyance direction, and discharges ink received in flashing. The liquid-absorptive rotator is formed from a liquid-absorptive material and rotated around a rotating shaft extending in the crossing direction. The counter member, being in contact with the liquid-absorptive rotator, has a conveyance structure for conveying ink in the ink receiving part in a carry-out direction directed toward the discharge port along an axial direction of the rotating shaft.

22 Claims, 12 Drawing Sheets

INKJET RECORDING APPARATUS

INCORPORATION BY REFERENCE

This application is based upon and claims the benefit of priority from the corresponding Japanese Patent Application No. 2021-057925 filed on Mar. 30, 2021, the entire contents of which are incorporated herein by reference.

BACKGROUND

The present disclosure relates to an inkjet recording apparatus.

In inkjet recording apparatuses, flashing (idle ejection) for ejecting ink through nozzles is periodically performed so as to reduce and prevent clogging of the nozzles due to ink drying.

For example, a conventional image recording apparatus includes a recording head for ejecting ink to a recording medium conveyed by a conveyor belt, and a receiving part for receiving ink ejected from the recording head by flashing operation. The receiving part includes an ink receiving saucer vertically overlapping with the recording head to receive ink ejected from the recording head, and a discharge port formed in a bottom surface of the ink receiving saucer to discharge received ink. The discharge port is connected to a waste liquid tank. Thus, ink received by the ink receiving saucer is discharged through the discharge port, neither accumulating on the ink receiving saucer nor needing to be taken out and thrown away from the ink receiving saucer.

SUMMARY

An inkjet recording apparatus according to one aspect of the present disclosure includes a recording head, a conveyor belt, and an ink receiving part. The recording head includes a plurality of nozzles for ejecting ink. The conveyor belt, being endless and having a plurality of openings that allow the ink ejected from the recording head to pass therethrough, conveys a recording medium to a position opposed to the recording head. The ink receiving part is placed in opposition to the recording head via the conveyor belt, and in flashing process in which the ink is ejected to the recording head at a timing other than ejection timings of the ink to the recording medium, the ink receiving part receives the ink that has passed through the openings. The ink receiving part includes a discharge port, a liquid-absorptive rotator, and a counter member. The discharge port is placed at an end portion in a crossing direction crossing a recording-medium conveyance direction, and allows the ink received in the flashing to be discharged. The liquid-absorptive rotator is formed from a liquid-absorptive material and rotated around a rotating shaft extending in the crossing direction. The counter member, being in contact with the liquid-absorptive rotator, has a conveyance structure for conveying the ink in the ink receiving part in a carry-out direction directed toward the discharge port along an axial direction of the rotating shaft.

DETAILED DESCRIPTION

Hereinbelow, embodiments of the present disclosure will be described with reference to the accompanying drawings. It should be noted that the disclosure is not limited to contents of the following description.

Figure 1:
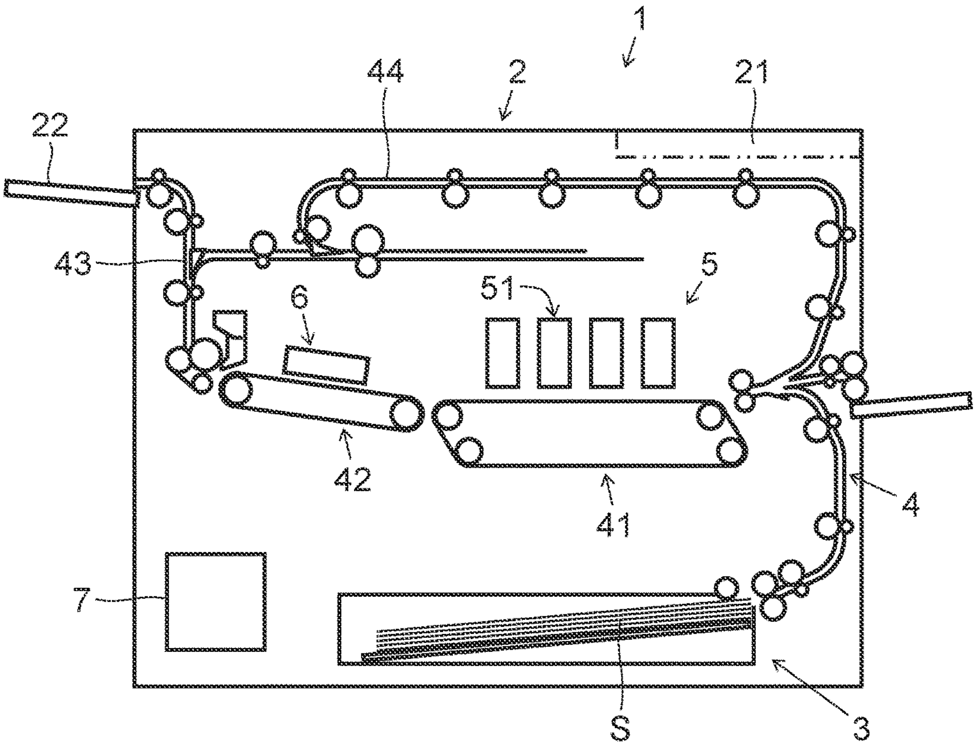
FIG. 1 is a schematic cross-sectional front view of an inkjet recording apparatus according to an embodiment of this disclosure.
Figure 2:
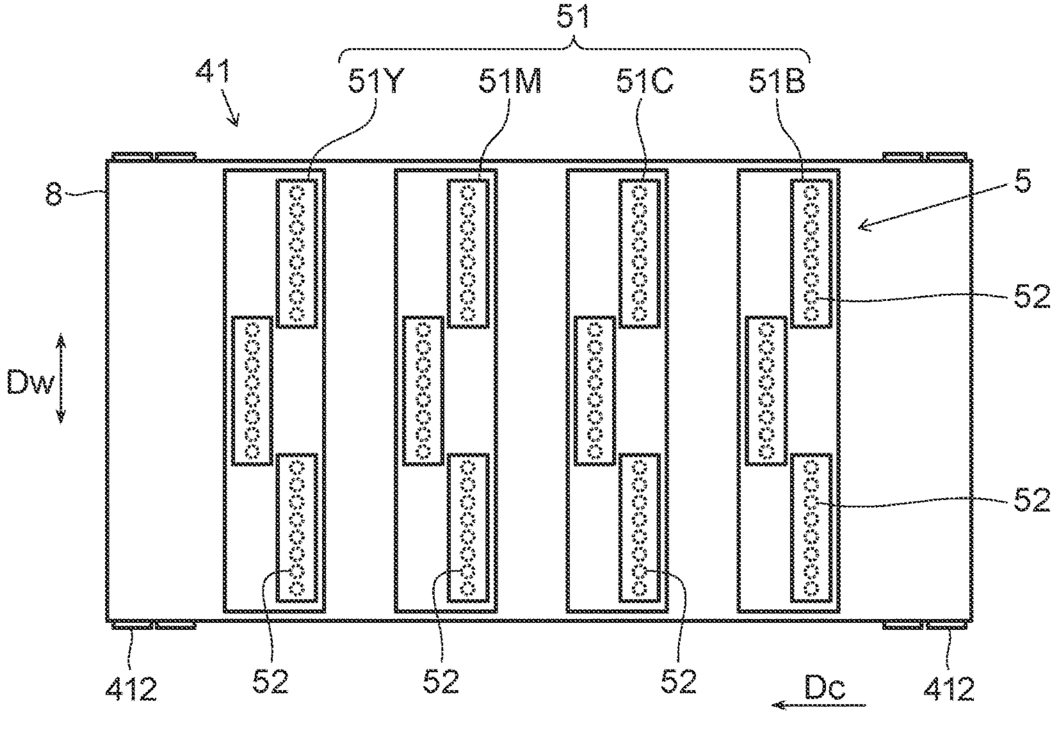
FIG. 2 is a top view of around a recording part of the inkjet recording apparatus of FIG. 1.
Figure 3:
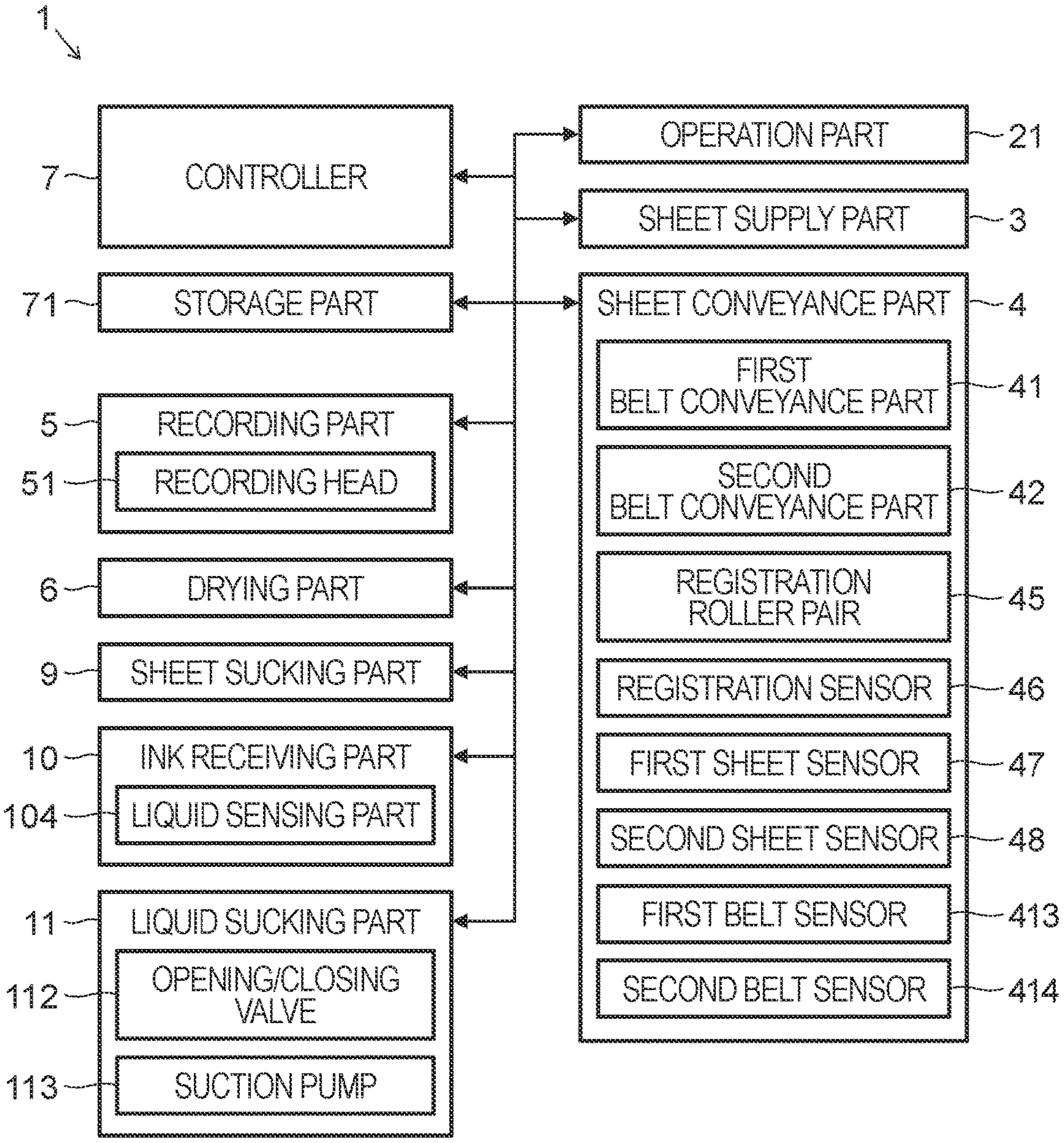
FIG. 3 is a schematic block diagram of the inkjet recording apparatus of FIG. 1.

FIG. 1 is a schematic cross-sectional view of an inkjet recording apparatus 1 according to an embodiment. FIG. 2 is a top view of around a recording part 5 of the inkjet recording apparatus 1 of FIG. 1. FIG. 3 is a schematic block diagram of the inkjet recording apparatus 1 of FIG. 1. The inkjet recording apparatus 1 is a printer of inkjet recording type, as an example. As shown in FIGS. 1, 2 and 3, the inkjet recording apparatus 1 includes an apparatus body 2, a sheet supply part 3, a sheet conveyance part 4, a recording part 5, a drying part 6, and a controller 7.

The apparatus body 2 includes an operation part 21. For example, the operation part 21, which is placed in frontal upper part of the apparatus body 2, accepts directly from a 2.0 user himself/herself such settings for recording conditions as type and size of a sheet (recording medium) to be used for recording, scale-up and scale-down, and need or no-need for double-sided recording, as well as an execution command or the like. In addition, the operation part 21 may also accept image data, recording conditions, execution commands, and the like from an external computer via a network line or the like.

The sheet supply part 3, housing therein a plurality of paper sheets (recording medium) S, separates and feeds out sheets S one by one in recording process. The sheet conveyance part 4 conveys a sheet S, which has been fed out from the sheet supply part 3, to the recording part 5 and the drying part 6, and moreover discharges the sheet S, which has been subjected to recording and drying, to a sheet discharge part 22. In a case where double-sided recording is executed, the sheet conveyance part 4 assorts a sheet S, whose first surface has been subjected to recording and drying, to a reversal conveyance part 44 by a branching part 43 and, with conveyance direction switched over, further conveys the top/bottom reversed sheet S once again to the recording part 5 and the drying part 6.

The sheet conveyance part 4 includes a first belt conveyance part 41 and a second belt conveyance part 42. The first belt conveyance part 41 and the second belt conveyance part 42 each convey a sheet S on an upper-side outer surface (top surface) of an endless belt while maintaining the sheet S in a sucked-and-held state. The first belt conveyance part 41 is placed below the recording part 5 to convey the sheet S. The second belt conveyance part 42, positioned sheet-conveyance downstream of the first belt conveyance part 41, is placed in the drying part 6 to convey the sheet S.

The recording part 5 is placed, with a specified gap, above the first belt conveyance part 41 so as to be opposed to a sheet S conveyed in a sucked-and-held state on the top face of the first belt conveyance part 41. The recording part 5 includes recording heads 51 of the line-type inkjet system. The recording heads 51, as shown in FIG. 2, include recording heads 51B. 51C, 51M, 51Y corresponding to four colors of black, cyan, magenta and yellow, respectively. On an individual-color basis, a plurality (e.g., three) of recording heads 51 are disposed in a staggered state along a crossing direction generally parallel to a sheet conveyance surface and crossing with a sheet conveyance direction Dc. The crossing direction may be diagonal to a sheet width direction Dw. In this embodiment, the crossing direction is the same as the sheet width direction Dw and therefore may be mentioned also as crossing direction Dw.

Each recording head 51 has a plurality of ink ejection nozzles 52 in its bottom portion. The plurality of ink ejection nozzles 52 are arrayed along the crossing direction Dw, thus enabled to eject ink over an entire recording range on the sheet S. That is, the recording head 51 has a plurality of ink ejection nozzles 52 for ejecting ink onto the sheet S. The recording part 5 ejects ink successively from the four-color recording heads 51B, 51C, 51M, 51Y toward the sheet S conveyed by the first belt conveyance part 41 to record a full-color image or a monochrome image on the sheet S.

The drying part 6 is placed sheet-conveyance downstream of the recording part 5 and equipped with the second belt conveyance part 42. The sheet S on which an ink image has been recorded in the recording part 5 has ink dried thereon while being conveyed as it is sucked and held on the second belt conveyance part 42 in the drying part 6.

The controller 7 includes a CPU as well as other electronic circuits and electronic components (none shown). Based on control programs and data stored in a storage part 71, the CPU controls operations of individual component elements provided in the inkjet recording apparatus 1 to execute processing related to functions of the inkjet recording apparatus 1. The sheet supply part 3, the sheet conveyance part 4, the recording part 5 and the drying part 6, receiving instructions individually from the controller 7, execute recording onto the sheet S in linkage with one another.

The controller 7 also executes flashing (idle ejection), which causes the recording heads 51 to eject ink, at a timing other than timings of ink ejection to the sheet S (in recording). Execution of the flashing makes it possible to reduce and prevent clogging of the ink ejection nozzles 52 due to drying of ink.

The storage part 71 consists of, for example, a combination of nonvolatile storage, such as program ROM (Read Only Memory) and data ROM, and volatile storage, such as RAM (Random Access Memory), which are unshown.

Figure 4:
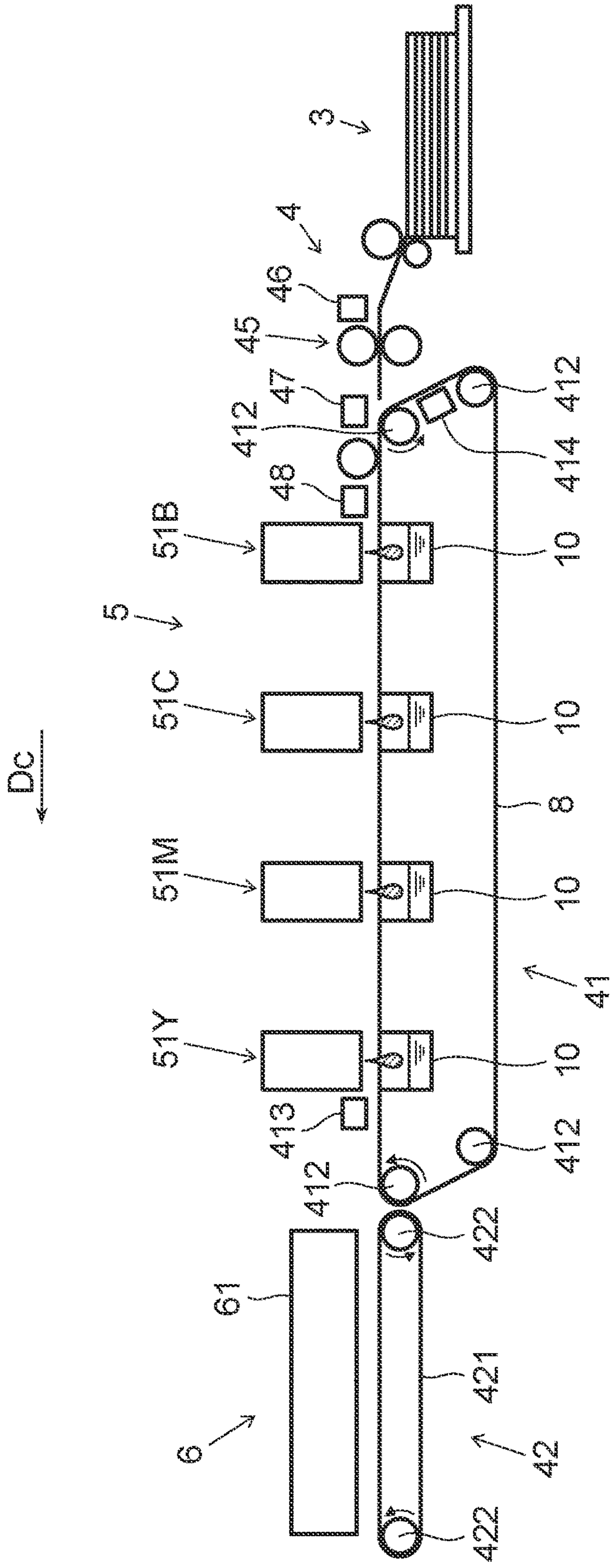
FIG. 4 is an explanatory view schematically showing a configuration of along a sheet conveyance path ranging from a sheet supply part to a second belt conveyance part in FIG. 1.

FIG. 4 is an explanatory view schematically showing a configuration of along a sheet conveyance path ranging from the sheet supply part 3 to the second belt conveyance part 42 in FIG. 1. Although ink (drip-shaped) ejected from the recording heads 51 is depicted below the recording heads 51 in FIG. 4 for explanation's sake, actually ejected ink is far smaller than ink (drip-shaped) depicted in FIG. 4. This is also applicable to FIG. 5 and the like, which will be used in later description.

The inkjet recording apparatus 1, as shown in FIG. 4, includes a registration roller pair 45, a registration sensor 46, a first sheet sensor 47, and a second sheet sensor 48.

The registration roller pair 45 is placed downstream of the sheet supply part 3 in the sheet conveyance direction Dc. The recording part 5 and the first belt conveyance part 41 are placed immediately downstream of the registration roller pair 45 in the sheet conveyance direction Dc. A sheet S fed out from the sheet supply part 3 passes through the sheet conveyance part 4 to reach a site where the registration roller pair 45 is. The controller 7 makes any skew of the sheet S corrected by the registration roller pair 45 and, while counting a timing with ink ejecting operation of the recording part 5, feeds out the sheet S toward the first belt conveyance part 41.

The registration sensor 46 is placed immediately upstream of the registration roller pair 45 in the sheet conveyance direction Dc. The registration sensor 46 senses a sheet S which has been fed out from the sheet supply part 3 and which arrives at the site where the registration roller pair 45 is. The controller 7 controls rotation of the registration roller pair 45 based on a sensing signal of the sheet S received from the registration sensor 46.

The first sheet sensor 47 is placed downstream of the registration roller pair 45 in the sheet conveyance direction Dc and moreover upstream of the first belt conveyance part 41 in the sheet conveyance direction Dc. The first sheet sensor 47 is a line sensor for sensing a widthwise position of the sheet S fed from the registration roller pair 45 to the first belt conveyance part 41. Based on a sensing signal of the sheet S received from the first sheet sensor 47, the controller 7 controls ink ejecting operations from ink ejection nozzles 52 which are relevant to a sheet width from among the plural ink ejection nozzles 52 of the individual-color recording heads 51, so that an image can be recorded on the sheet S.

The second sheet sensor 48 is placed downstream of the first sheet sensor 47 in the sheet conveyance direction Dc and upstream of the recording part 5 in the sheet conveyance direction Dc as well as above the first belt conveyance part 41. The second sheet sensor 48 is a sensor for sensing a conveyance-direction position of a sheet S conveyed by the first belt conveyance part 41. Based on a sensing signal of the sheet S received from the second sheet sensor 48, the controller 7 controls ink ejecting operations from ink ejection nozzles 52 to the sheet S that has been conveyed by the first belt conveyance part 41 to reach positions opposed to individual-color recording heads 51, respectively.

The first belt conveyance part 41 is placed below the recording part 5. The first belt conveyance part 41, sucking and holding a sheet S on its top surface, conveys the sheet S along the sheet conveyance direction Dc. The first belt conveyance part 41 includes a first conveyor belt (conveyor belt) 8, rollers 412, a first belt sensor 413, and a second belt sensor 414.

The first conveyor belt 8 is an endless belt and stretched over four rollers 412 placed inside thereof. The rollers 412 are placed inside the first conveyor belt 8 and supported rotatable around a rotational axis extending along the crossing direction Dw (see FIG. 2). One of the four rollers 412 serves as a driving roller, and the first conveyor belt 8 is rotated by the driving roller in a way that its upper side is moved in the sheet conveyance direction Dc. The first conveyor belt 8 has a plurality of hole portions 81 and a plurality of openings 82 (opening groups 83) both of which extend through between top and bottom (see FIG. 6). The first conveyor belt 8 conveys the sheet S to positions opposed to the recording heads 51.

The first belt sensor 413 is placed downstream of the recording part 5 in the sheet conveyance direction Dc and moreover above the first belt conveyance part 41. The second belt sensor 414 is placed inside the first conveyor belt 8 and moreover, as viewed in a rotational direction of the first conveyor belt 8, upstream of a roller 412 located adjacent to an upstream end portion of the upper side of the first conveyor belt 8 in the sheet conveyance direction Dc. The first belt sensor 413 and the second belt sensor 414 sense positions of the opening groups 83 (see FIG. 6), which are sets of plurality of openings 82 provided in the first conveyor belt 8. It is noted that the first belt sensor 413 also has functions equivalent to the second sheet sensor 48.

The second belt conveyance part 42 is placed in the drying part 6. The second belt conveyance part 42, sucking and holding a sheet S on its top surface, conveys the sheet S along the sheet conveyance direction Dc. The second belt conveyance part 42 includes a second conveyor belt 421 and rollers 422.

The second conveyor belt 421 is an endless belt and stretched over the two rollers 422 placed inside thereof. The rollers 422 are placed inside the second conveyor belt 421 and rotatably supported around a rotational axis extending along the crossing direction Dw (see FIG. 2). One of the two rollers 422 serves as a driving roller, and the second conveyor belt 421 is rotated by the driving roller in a way that its upper side is moved in the sheet conveyance direction Dc.

The drying part 6 includes a drier 61. The sheet S on which an image has been recorded by the recording part 5, while being conveyed by the second belt conveyance part 42, is dried by the drier 61 in the drying part 6, and then conveyed downstream of the drying part 6 in the sheet conveyance direction Dc.

Figure 5:
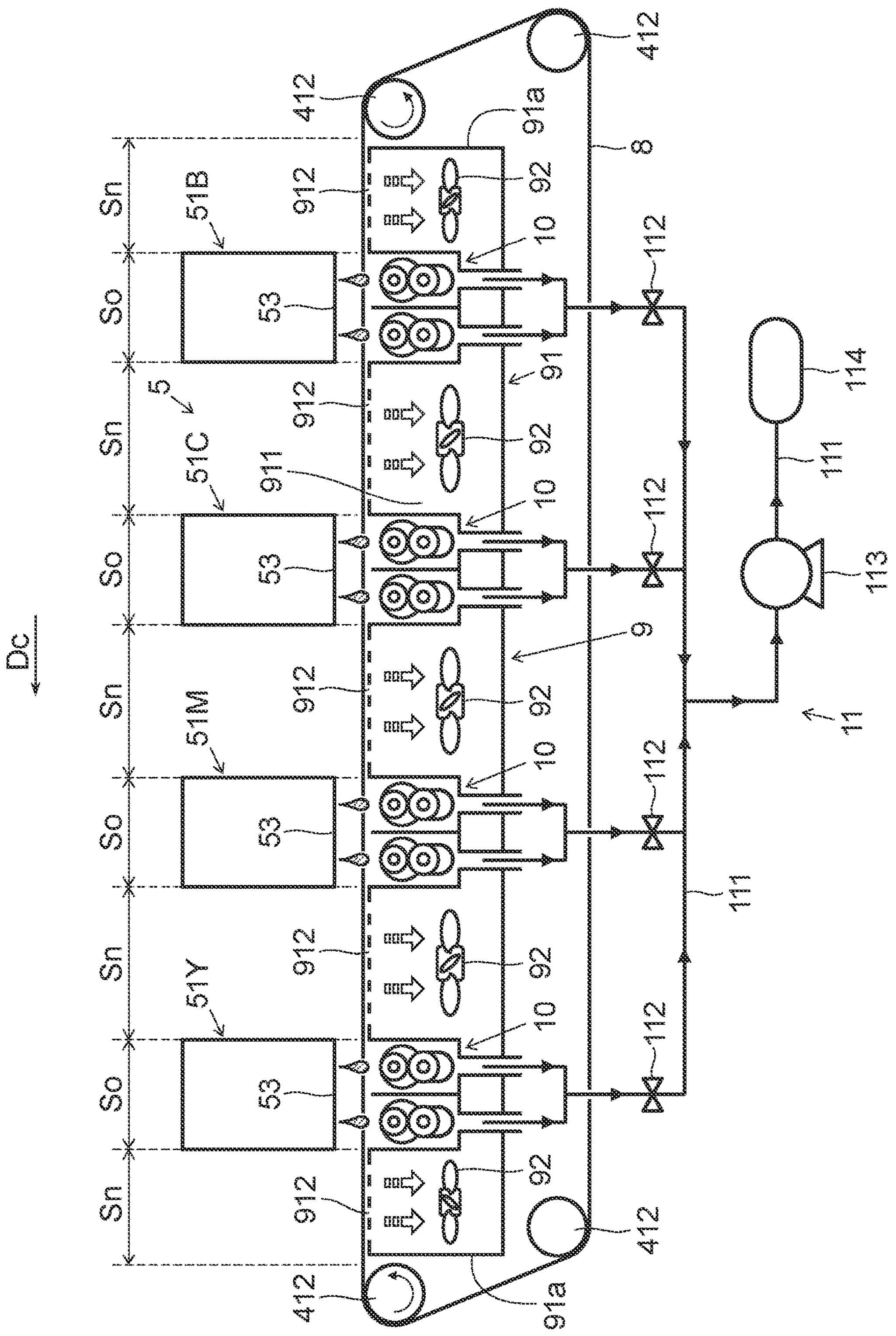
FIG. 5 is a front view of around the recording part and a first belt conveyance part according to a first embodiment of the disclosure.
Figure 6:
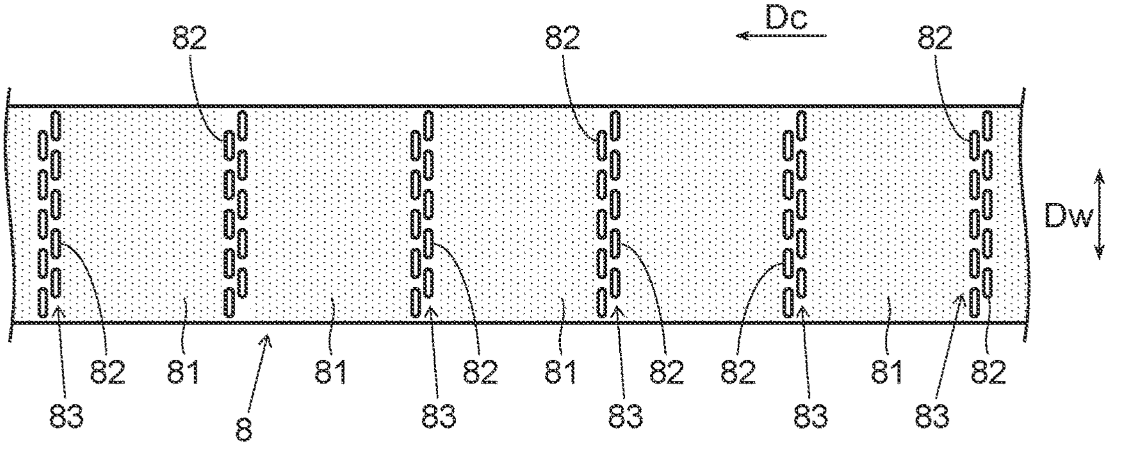
FIG. 6 is a plan view of a first conveyor belt of the first belt conveyance part of FIG. 5.

FIG. 5 is a front view of around the recording part 5 and the first belt conveyance part 41 according to a first embodiment of the disclosure. FIG. 6 is a plan view of the first conveyor belt 8 of the first belt conveyance part 41 of FIG. 5. The inkjet recording apparatus 1 of the first embodiment, as shown in FIG. 5, includes a sheet sucking part 9, ink receiving parts 10, and a liquid sucking part 11.

The sheet sucking part 9 is placed in upper part inside the first conveyor belt 8 so as to be opposed to one surface (upper-side inner surface, back surface) of the first conveyor belt 8 counter to its sheet conveyance surface (upper-side outer surface, top surface). The sheet sucking part 9 includes a sheet suction casing 91 and intake fans 92.

The sheet suction casing 91 has, in its interior, suction spaces 911 each surrounded in four sides by side walls 91*a*. The suction spaces 911 are located at unopposed sections Sn, respectively, in which the first conveyor belt 8 and one recording head 51 are unopposed to each other, where each unopposed section Sn is located, as viewed in the sheet conveyance direction Dc, on upstream and downstream sides of an opposed section So in which the first conveyor belt 8 and one recording head 51 are opposed to each other. At five sites within a range from a site upstream and downward of the black recording head 51B in the sheet conveyance direction Dc to another site downstream and downward of the yellow recording head 51Y in the sheet conveyance direction Dc, the suction spaces 911 are opposed to one surface (upper-side inner surface, back surface) of the first conveyor belt 8 on its one side counter to the sheet conveyance surface (upper-side outer surface, top surface) of the first conveyor belt 8.

The sheet suction casing 91 has a plurality of intake holes 912 placed at its top face in upper part of the suction spaces 911. The plurality of intake holes 912 extend vertically through the sheet suction casing 91.

Each intake fan 92 is placed at lower part in the suction space 911 inside the sheet suction casing 91. In addition, the first conveyor belt 8, as shown in FIG. 6, has a plurality of hole portions 81 and a plurality of openings 82. The hole portions 81 and the openings 82 extend through between top and bottom of the first conveyor belt 8. Driving the intake fans 92 causes the sheet sucking part 9 to suck up air through the intake holes 912, the hole portions 81 and the openings 82, so that the sheet S is sucked up to the sheet conveyance surface (upper-side outer surface, top surface) of the first conveyor belt 8.

As air is sucked up by the sheet sucking part 9, the plurality of hole portions 81 and the plurality of openings 82 allow the sheet S to be sucked up to the upper-side outer surface (top surface), i.e. sheet conveyance surface, of the first conveyor belt 8. An opening area of each opening 82 is larger than an opening area of each hole portion 81. The openings 82 allow ink ejected from the recording heads 51 in flashing to pass therethrough. The openings 82 aggregate in plurality (e.g., ten pieces) to make up an opening group 83.

The ink receiving parts 10 are placed below the recording heads 51, respectively, in opposition thereto with the first conveyor belt 8 interposed therebetween. That is, each ink receiving part 10 is placed in lower part in an oppositional section So in which the first conveyor belt 8 and the recording head 51 are opposed to each other. The suction spaces 911 are adjoining to each ink receiving part 10 on both upstream side and downstream side, respectively, of the sheet conveyance direction Dc. The ink receiving parts 10 receive ink that has passed through the openings 82 of the first conveyor belt 8 in flashing.

The liquid sucking part 11 is placed below the ink receiving parts 10. The liquid sucking part 11 sucks and discharges liquid such as ink stored in the ink receiving parts 10. The liquid sucking part 11 includes, for example, a liquid delivering tube 111, opening/closing valves 112, a suction pump 113, and a collection tank 114.

The liquid delivering tube 111 makes connections between the four ink receiving parts 10 placed below the four recording heads 51, respectively, and the suction pump 113. The liquid delivering tube 111 is connected to a later-described discharge port 1011 of each ink receiving part 10. The liquid delivering tube 111 also makes a connection between the suction pump 113 and the collection tank 114. Ink or other liquid stored within the ink receiving parts 10 circulates inside the liquid delivering tube 111.

The opening/closing valves 112 are connected to the liquid delivering tube 111. Each opening/closing valve 112 is placed between the ink receiving part 10 and the suction pump 113. For example, for four ink receiving parts 10, four opening/closing valves 112 are placed below the ink receiving parts 10, respectively. Each opening/closing valve 112 is given, for example, as a solenoid valve, with its opening and closing controlled by the controller 7. The opening/closing valves 112 open and close a liquid discharge path within the liquid delivering tube 111.

The suction pump 113 is placed downstream of the ink receiving parts 10 in an ink discharge direction and upstream of the collection tank 114 in the ink discharge direction. The suction pump 113 sucks up ink stored in each of the four ink receiving parts 10 and ejects the ink toward the collection tank 114.

The collection tank 114 is placed downstream of the suction pump 113 in the ink discharge direction and at a downstream end of the liquid delivering tube 111 in the ink discharge direction. Operating the suction pump 113 causes ink stored in each of the four ink receiving parts 10 to be delivered to the collection tank 114 and collected by the collection tank 114.

Figure 7:
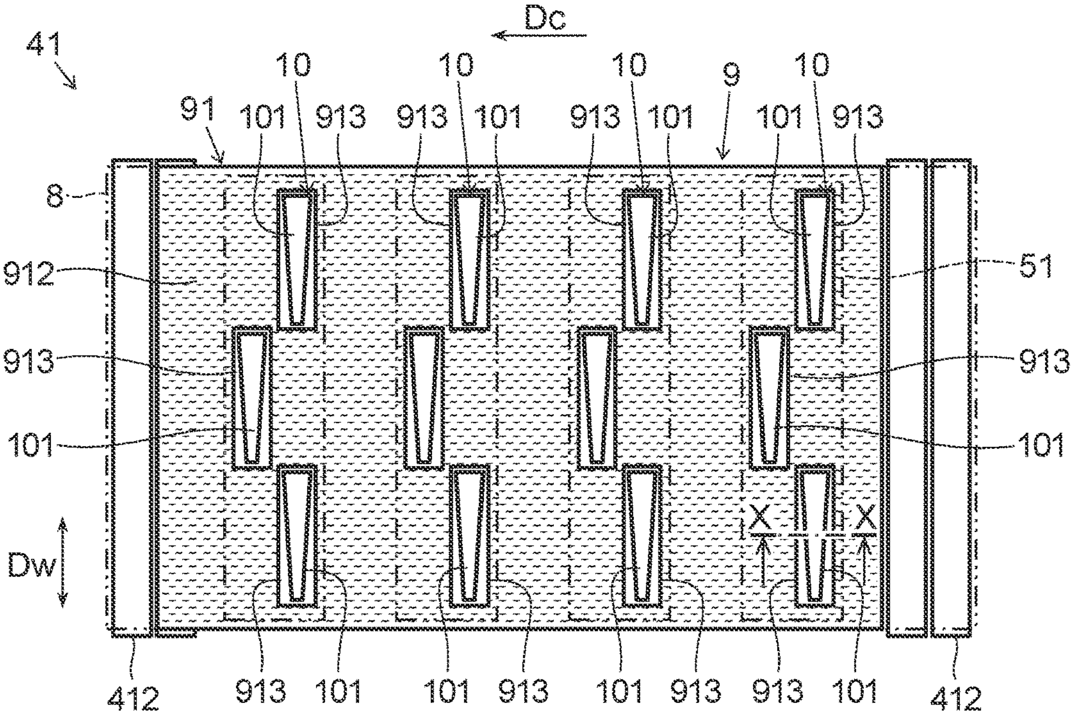
FIG. 7 is a plan view of the first belt conveyance part of FIG. 5 with the first conveyor belt removed.
Figure 8:
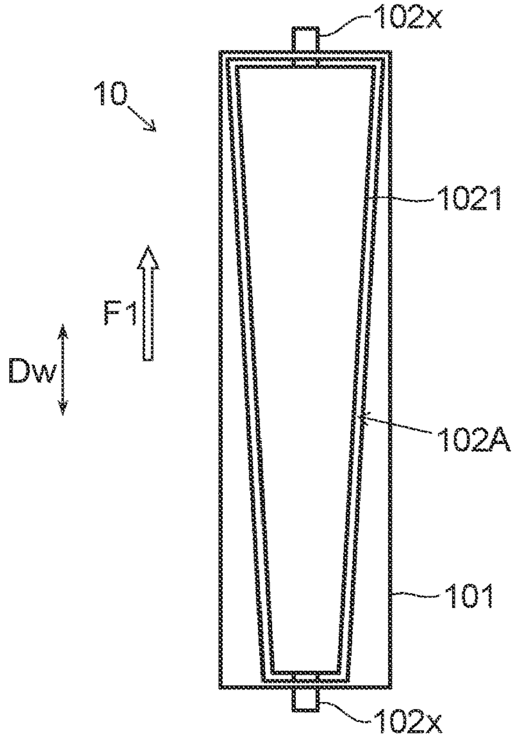
FIG. 8 is an enlarged plan view of an ink receiving part of the first belt conveyance part of FIG. 5.
Figure 9:
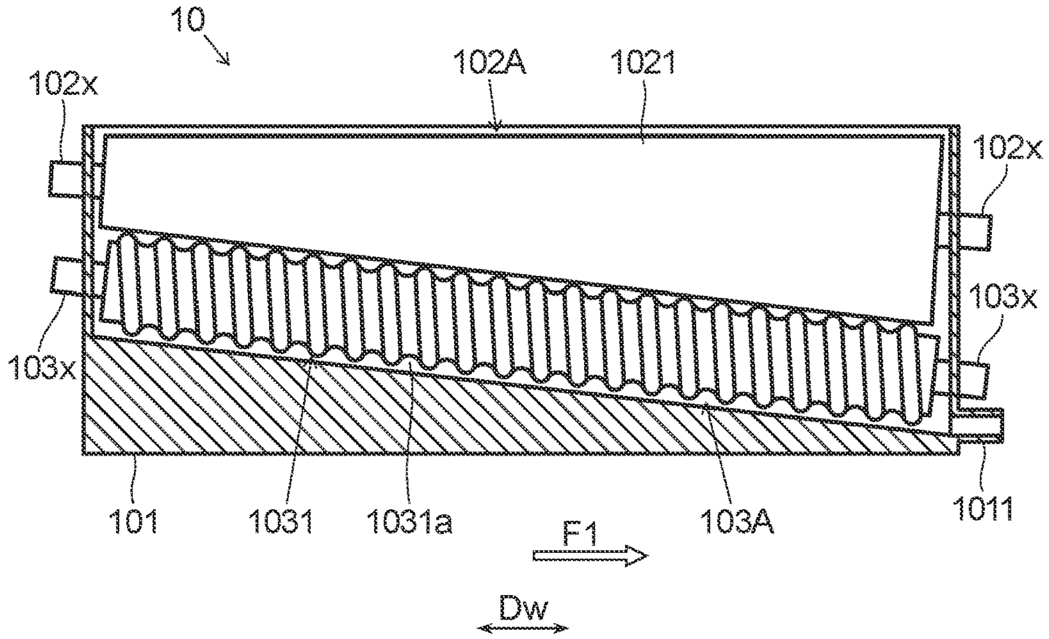
FIG. 9 is a cross-sectional side view of the ink receiving part of FIG. 8.
Figure 10:
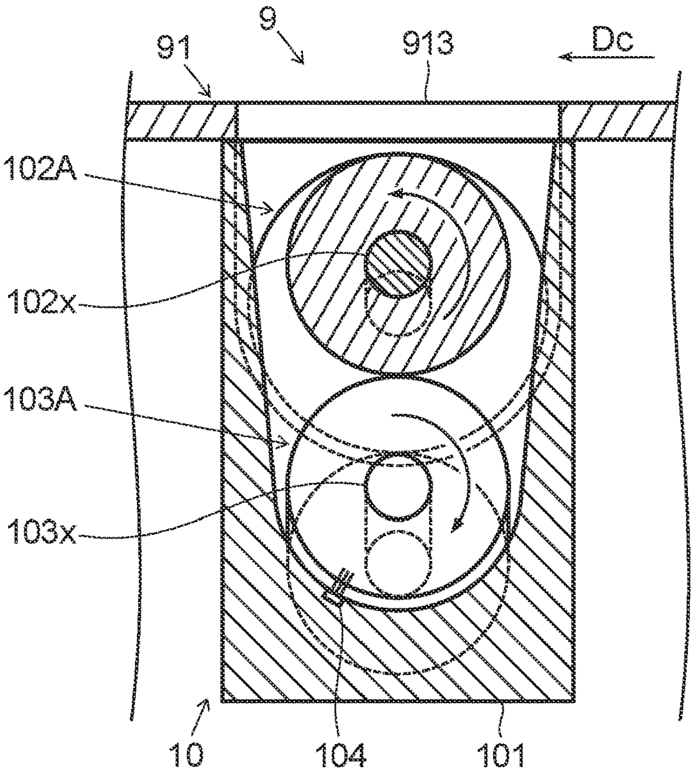
FIG. 10 is a cross-sectional front view of the ink receiving part of FIG. 8.

FIG. 7 is a plan view of the first belt conveyance part 41 of FIG. 5 with the first conveyor belt 8 removed. FIG. 8 is an enlarged plan view of an ink receiving part 10 of the first belt conveyance part 41 of FIG. 5. FIGS. 9 and 10 are a cross-sectional side view and a cross-sectional front view, respectively, of the ink receiving part 10 of FIG. 8. In addition, the sheet suction casing 91 is depicted in FIG. 10.

The ink receiving part 10 includes a housing 101, a liquid-absorptive rotator 102A and a conveyance rotator (counter member) 103A, these three component elements being provided as one set. In each ink receiving part 10, one set of the housing 101, the liquid-absorptive rotator 102A and the conveyance rotator 103A is provided for every one of the individual-color three recording heads 51. Each set of the housing 101 and the liquid-absorptive rotator 102A is placed in vertical opposition to the recording head 51.

The housing 101 is placed immediately below the top face of the sheet suction casing 91. The housing 101 is a box-like member of a rectangular parallelepiped shape longitudinally extending along the crossing direction Dw with its top face opened. In addition, the sheet suction casing 91 has a plurality of window portions 913 placed at its top face in upper part of the housing 101. The window portions 913 are provided equal in numerical quantity to the sets of housing 101, the liquid-absorptive rotator 102A and the conveyance rotator 103A. The plurality of window portions 913 extend vertically through the sheet suction casing 91. The conveyance rotator 103A is opposed, through the window portion 913, to one surface (upper-side inner surface, back surface) of the first conveyor belt 8 counter to its sheet conveyance surface.

Each housing 101, internally having a space that receives ink ejected in flashing, houses the liquid-absorptive rotator 102A and the conveyance rotator 103A in the space. The housing 101 rotatably supports the liquid-absorptive rotator 102A and the conveyance rotator 103A. The housing 101 has a discharge port 1011. The discharge port 1011 is placed at an end portion of the housing 101 in the crossing direction Dw to discharge ink received in flashing.

The liquid-absorptive rotator 102A is placed immediately below the top face of the sheet suction casing 91. The liquid-absorptive rotator 102A longitudinally extends along the crossing direction Dw. The liquid-absorptive rotator 102A is rotatably supported by the housing 101 at both end portions of a rotating shaft 102*x* extending in the crossing direction Dw. As a result of this, the liquid-absorptive rotator 102A is rotated around the rotating shaft 102*x* extending in the crossing direction Dw.

The liquid-absorptive rotator 102A has a liquid absorber 1021. The liquid absorber 1021 is provided at an outer circumferential portion of the rotating shaft 102*x*. The liquid absorber 1021 is formed from a liquid-absorptive material such as PVA (polyvinyl alcohol) sponge having a continuous pore structure.

The conveyance rotator 103A is a counter member which is placed immediately below the liquid-absorptive rotator 102A in opposition thereto and which is in contact with the liquid-absorptive rotator 102A. The conveyance rotator 103A longitudinally extends along the crossing direction Dw. The conveyance rotator 103A is rotatably supported by the housing 101 at both end portions of a rotating shaft 103*x* extending in the crossing direction Dw. As the rotating shaft 103*x* is rotated by a motor or the like, the conveyance rotator 103A is rotated around the rotating shaft 103*x* extending in the crossing direction Dw.

The liquid-absorptive rotator 102A may be rotated subordinately by being in contact with the rotating conveyance rotator 103A, or may be rotated by the rotating shaft 102*x* being rotated by a motor or the like. A rotational direction of the conveyance rotator 103A in flashing may be set equal to the rotational direction of the first conveyor belt 8. In this case, even when ink clinging on the conveyance rotator 103A has clung to the first conveyor belt 8, clinging range of the ink on the first conveyor belt 8 can be reduced. Also, even when the conveyance rotator 103A and the first conveyor belt 8 have come into contact with each other, a resultant impact can be reduced, so that individual members are less likely to be damaged.

The conveyance rotator 103A has a conveyance structure 1031. The conveyance structure 1031 is provided at an outer circumferential portion of the conveyance rotator 103A. The conveyance structure 1031 conveys ink within the ink receiving part 10 in a first direction (carry-out direction) F1 directed toward the discharge port 1011 along an axial direction of the rotating shaft 103*x*, i.e., in a direction from below to above in FIG. 8 and from left to right in FIG. 9.

According to the above-described configuration, by the liquid-absorptive rotator 102A, ink ejected from the recording head 51 during flashing can be prevented from splashing up and scattering. Further, by the conveyance rotator 103A, ink absorbed by the liquid-absorptive rotator 102A can be conveyed toward the discharge port 1011 within the ink receiving part 10 so as to be forcedly discharged from within the ink receiving part 10. Therefore, even with ink thickened in viscosity as an example, ink ejected during flashing can be collected with high efficiency.

The liquid absorber 1021 of the liquid-absorptive rotator 102A is truncated cone shaped in outer form. The truncated cone-shaped liquid-absorptive rotator 102A, in its outer form, increases in diameter more and more from upstream side toward downstream side of the first direction F1. According to this configuration, lower part of the liquid-absorptive rotator 102A becomes lower and lower from upstream side toward downstream side of the first direction F1. Therefore, even with ink thickened in viscosity as an example, force of conveyance toward the discharge port 1011 can be enhanced, so that ink can be collected with even higher efficiency.

An end portion of the liquid-absorptive rotator 102A on the ink ejection surface 53 (see FIG. 5) side of the recording head 51 (an upper end portion of liquid-absorptive rotator 102A in this embodiment) is generally parallel to the ink ejection surface 53. In addition, since the liquid-absorptive rotator 102A is truncated cone shaped in outer form, the rotating shaft 102*x* of the liquid-absorptive rotator 102A extends with such an inclination as to become lower and lower from upstream side toward downstream side of the first direction F1.

According to this configuration, a vertical gap between the liquid-absorptive rotator 102A and the ink ejection surface 53 of the recording head 51 can be made as narrow as possible. As a result, it becomes possible to reduce scattering of ink mist that occurs between the recording head 51 and the ink receiving part 10. Therefore, ink stains of the recording head 51, the first conveyor belt 8, and the sheet S can be suppressed.

The counter member being in contact with the liquid-absorptive rotator 102A and having the conveyance structure for conveying ink is the conveyance rotator 103A that is placed below the liquid-absorptive rotator 102A and that is rotated around the rotating shaft 103*x* extending in the crossing direction Dw. According to this configuration, by making use of rotational force of the conveyance rotator 103A, ink absorbed by the liquid-absorptive rotator 102A can be conveyed toward the discharge port 1011 in the ink receiving part 10 so as to be forcedly discharged from within the ink receiving part 10. Therefore, ink ejected during flashing can be collected with high efficiency.

In addition, the counter member of the liquid-absorptive rotator 102A may also be the housing 101 that is provided in the ink receiving part 10 to receive ink during flashing and that rotatably supports the liquid-absorptive rotator 102A in its inside. In this case, a conveyance structure for conveying ink is formed at an inner surface of the housing 101 facing the liquid-absorptive rotator 102A. According to this configuration, without using any driving member such as a rotator, ink absorbed by the liquid-absorptive rotator 102A can be conveyed toward the discharge port 1011 in the ink receiving part 10 so as to be forcedly discharged from within the ink receiving part 10. Therefore, ink ejected during flashing can be collected with a configuration intended for lower cost and lower power consumption.

The conveyance structure 1031 has a recessed zone 1031*a*. The recessed zone 1031*a* is provided at an outer circumferential portion of the conveyance rotator 103A and formed into a helical form extending along the first direction F1. In addition, the conveyance structure 1031 may also be given by providing a protruded zone. That is, the conveyance structure 1031 is preferably formed into a helical recessed zone 1031*a* or protruded zone.

According to this configuration, by the helical recessed zone 1031*a* or protruded zone, conveyance of ink in the first direction F1 can be facilitated. Therefore, even with ink thickened in viscosity as an example, force of conveyance toward the discharge port 1011 can be enhanced, so that ink can be collected with even higher efficiency.

The conveyance rotator 103A is cylindrical shaped in outer form. The cylindrical-shaped conveyance rotator 103A is, in outer form, unchanged in diameter over an entire range of the crossing direction Dw. According to this configuration, formation of the conveyance rotator 103A is facilitated.

The conveyance rotator 103A, which is metallic roller shaped, has a recessed zone 1031*a* helically carved at its outer circumferential portion, by which a conveyance structure 1031 is formed. The conveyance rotator 103A, by virtue of its being roller-shaped, can be enhanced in strength. Thus, it becomes possible to continue conveyance of ink thickened in viscosity over a long term. Further, even ink thickened to higher viscosity can also be conveyed.

An inner bottom portion of the ink receiving part 10 has an inclination that becomes lower and lower in a direction from upstream side toward downstream side of the first direction F1, i.e., from left toward right in FIG. 9. According to this configuration, conveyance of ink within the ink receiving part 10 toward the discharge port 1011 can be facilitated. Therefore, even with ink thickened in viscosity as an example, ink ejected during flashing can be collected with high efficiency.

The conveyance rotator 103A, as described before, has the conveyance structure 1031 that is cylindrical shaped in outer form. The inner bottom portion of the ink receiving part 10 has an inclination, and the conveyance rotator 103A is placed in adjacency to the inner bottom portion of the ink receiving part 10. For example, a lower-part outer circumferential portion of the conveyance rotator 103A extends in the crossing direction Dw parallel to the inner bottom portion of the ink receiving part 10. As shown in FIG. 10, the lower-part outer circumferential portion of the conveyance rotator 103A and the inner bottom portion of the ink receiving part 10 are configured so as to extend along each other with a specified gap therebetween in their outer form.

According to this configuration, the conveyance rotator 103A can be brought as close as possible to the inner bottom portion of the ink receiving part 10. As a result, ink conveyance performance of the ink receiving part 10 can be improved.

The ink receiving part 10, as shown in FIG. 10, includes a brush member 104. The brush member 104 is provided at an inner bottom portion of the ink receiving part 10. In more detail, the brush member 104 is placed downstream of a lowermost portion within the ink receiving part 10 in the rotational direction of the conveyance rotator 103A. The brush member 104 is in contact with the outer circumferential portion of the conveyance rotator 103A.

According to this configuration, hard clinging of ink to the conveyance rotator 103A can be suppressed. As a result, ink of the ink receiving part 10 can be conveyed smoothly toward the discharge port 1011. Also, degradation of ink conveyance performance of the conveyance rotator 103A itself can be suppressed.

Figure 11:
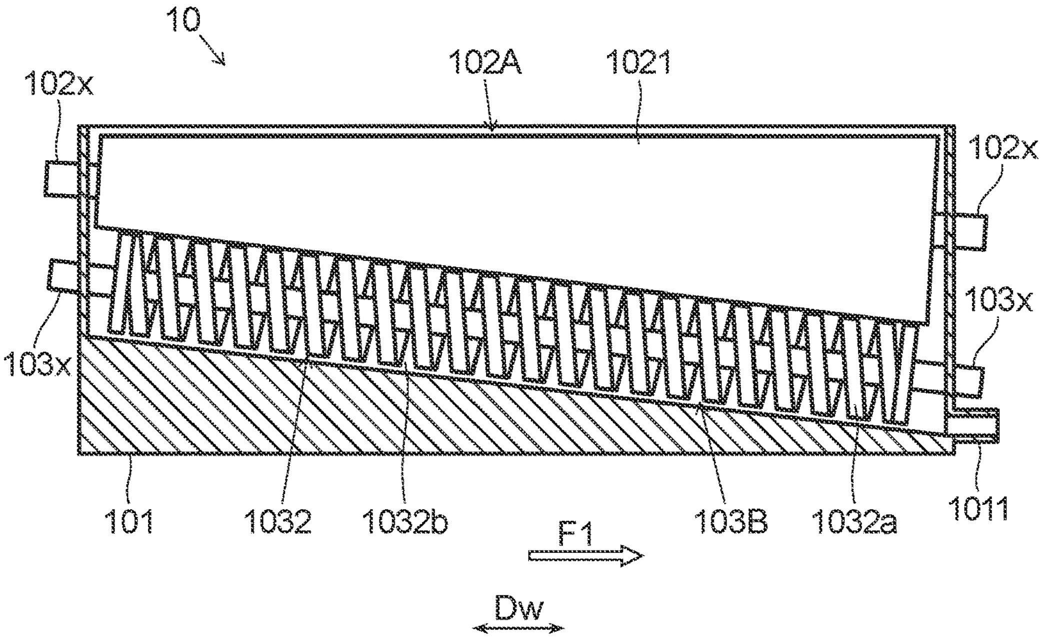
FIG. 11 is a cross-sectional side view of an ink receiving part according to a second embodiment of the disclosure.

FIG. 11 is a cross-sectional side view of an ink receiving part 10 according to a second embodiment of the disclosure. An inkjet recording apparatus 1 according to the second embodiment includes the ink receiving part 10 shown in FIG. 11. The ink receiving part 10 includes a liquid-absorptive rotator 102A and a conveyance rotator 103B. The second embodiment is identical in configuration to the first embodiment except the conveyance rotator 103B.

The conveyance rotator 103B includes a rotating shaft 103*x* and a conveyance structure 1032. The rotating shaft 103*x* extends in a rod-like shape along the crossing direction Dw. Both end portions of the rotating shaft 103*x* are rotatably supported by the housing 101. The rotating shaft 103*x* is metallic, as an example.

The conveyance structure 1032 is formed by helically winding a wire rod 1032*a* at an outer circumferential portion of the rotating shaft 103*x*. The wire rod 1032*a* is connected to the rotating shaft 103*x* so as to be rotated along with the rotating shaft 103*x*. The conveyance structure 1032 has a recessed zone 1032*b* between wire rod portions 1032*a* neighboring one another in the crossing direction Dw. According to this configuration, weight reduction of the conveyance rotator 103B can be implemented.

In addition, the conveyance rotator 103B is cylindrical shaped in outer form. This means that whereas the recessed zone 1032*b* is present in the conveyance structure 1032, the most radially protruded zone of the conveyance structure 1032 are unchanged in diameter over an entire range of the crossing direction Dw.

Figure 12:
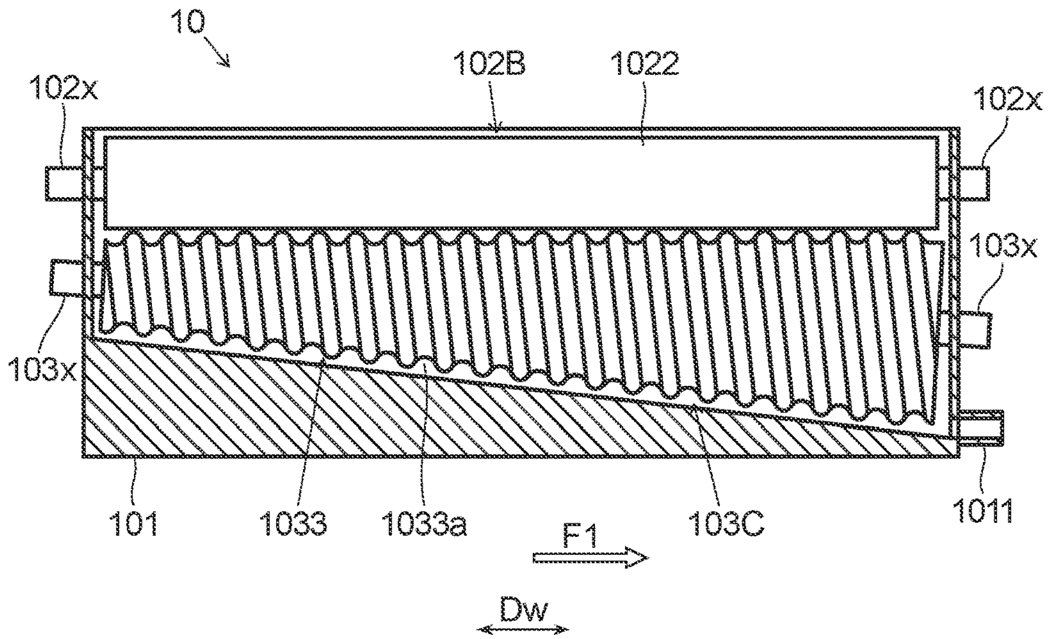
FIG. 12 is a cross-sectional side view of an ink receiving part according to a third embodiment of the disclosure.

FIG. 12 is a cross-sectional side view of an ink receiving part 10 according to a third embodiment of the disclosure. An inkjet recording apparatus 1 according to the third embodiment includes the ink receiving part 10 shown in FIG. 12. The ink receiving part 10 includes a liquid-absorptive rotator 102B and a conveyance rotator 103C.

The liquid-absorptive rotator 102B has a liquid absorber 1022. The liquid absorber 1022 is provided at an outer circumferential portion of the rotating shaft 102*x*. The liquid-absorptive rotator 102B is cylindrical shaped in outer form. The cylindrical-shaped liquid-absorptive rotator 102B is, in outer form, unchanged in diameter over an entire range of the crossing direction Dw. According to this configuration, formation of the liquid-absorptive rotator 102B is facilitated.

The conveyance rotator 103C is truncated cone shaped in outer form. The truncated cone-shaped conveyance rotator 103C, in its outer form, increases in diameter more and more from upstream side toward downstream side of the first direction F1. According to this configuration, lower part of the conveyance rotator 103C becomes lower and lower from upstream side toward downstream side of the first direction F1. Therefore, even with ink thickened in viscosity as an example, force of conveyance toward the discharge port 1011 can be enhanced, so that ink can be collected with even higher efficiency.

The conveyance rotator 103C is metallic roller shaped, and has a recessed zone 1033*a* helically carved at its outer circumferential portion, by which a conveyance structure 1033 is formed. The conveyance rotator 103C, by virtue of its being roller-shaped, can be enhanced in strength. Thus, it becomes possible to continue conveyance of ink thickened in viscosity over a long term. Further, even ink thickened to higher viscosity can also be conveyed.

In addition, an inner bottom portion of the ink receiving part 10 has an inclination that becomes lower and lower in a direction from upstream side toward downstream side of the first direction F1, i.e., from left toward right in FIG. 12. The conveyance rotator 103C is placed in adjacency to the inner bottom portion of the ink receiving part 10. According to this configuration, conveyance of ink within the ink receiving part 10 toward the discharge port 1011 can be facilitated.

Figure 13:
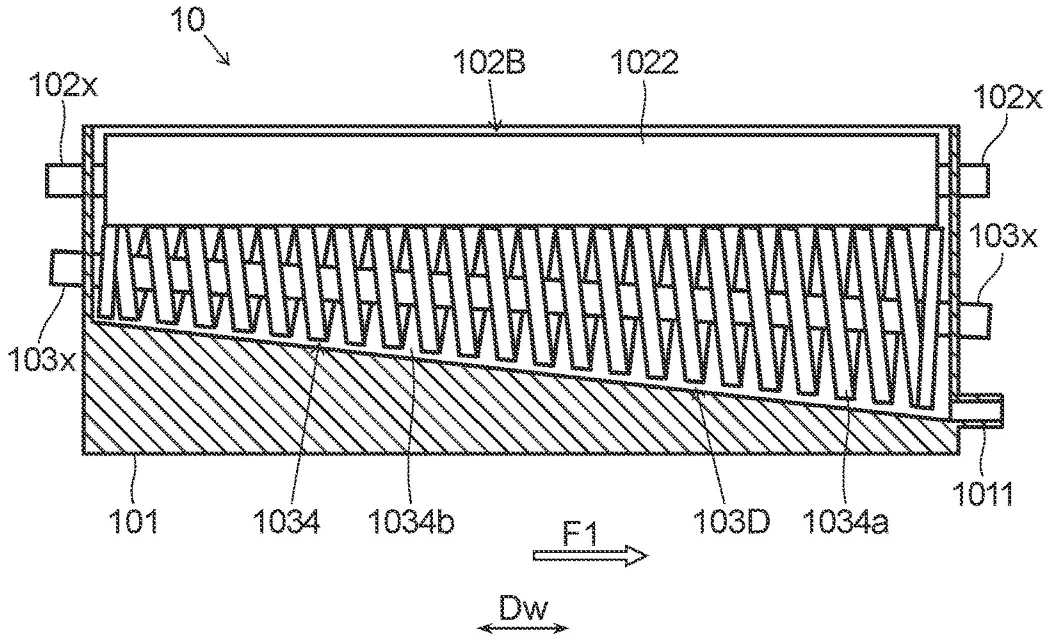
FIG. 13 is a cross-sectional side view of an ink receiving part according to a fourth embodiment of the disclosure.

FIG. 13 is a cross-sectional side view of an ink receiving part 10 according to a fourth embodiment of the disclosure. An inkjet recording apparatus 1 according to the fourth embodiment includes the ink receiving part 10 shown in FIG. 13. The ink receiving part 10 includes a liquid-absorptive rotator 102B and a conveyance rotator 103D.

The liquid-absorptive rotator 102B is cylindrical shaped in outer form. According to this configuration, formation of the liquid-absorptive rotator 102B is facilitated.

The conveyance rotator 103D is truncated cone shaped in outer form. According to this configuration, even with ink thickened in viscosity as an example, force of conveyance toward the discharge port 1011 can be enhanced, so that ink can be collected with even higher efficiency.

A conveyance structure 1034 is formed by helically winding a wire rod 1034*a* at an outer circumferential portion of the rotating shaft 103*x*. According to this configuration, weight reduction of the conveyance rotator 103D can be implemented.

Figure 14:
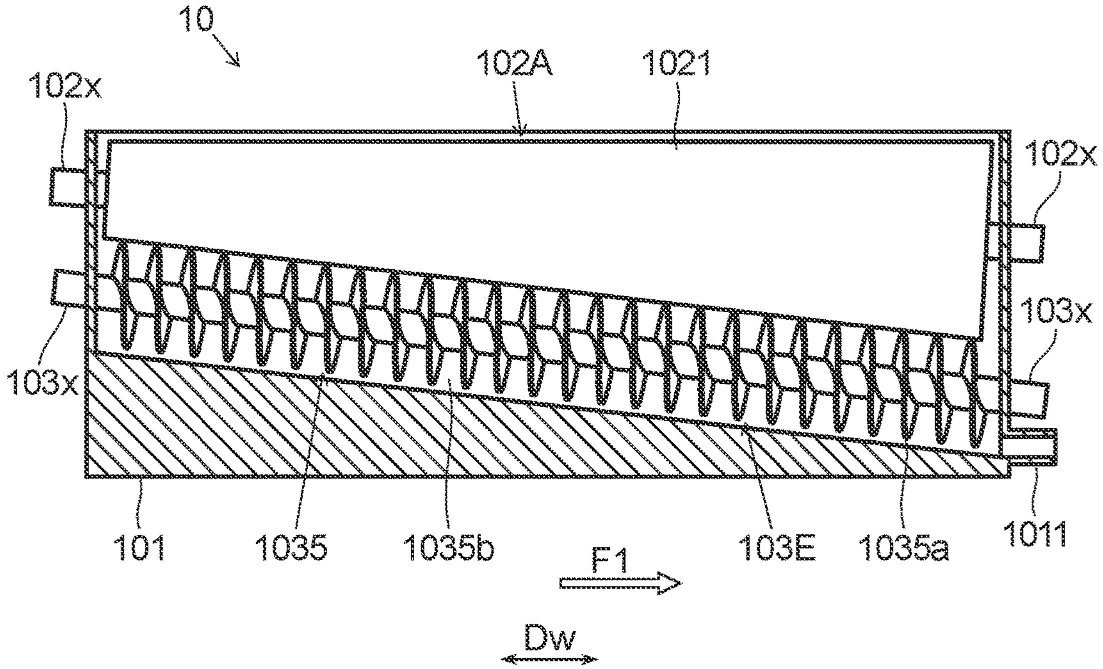
FIG. 14 is a cross-sectional side view of an ink receiving part according to a fifth embodiment of the disclosure.

FIG. 14 is a cross-sectional side view of an ink receiving part 10 according to a fifth embodiment of the disclosure. An inkjet recording apparatus 1 according to the fifth embodiment includes the ink receiving part 10 shown in FIG. 14. The ink receiving part 10 includes a liquid-absorptive rotator 102A and a conveyance rotator 103E.

The conveyance rotator 103E includes a rotating shaft 103*x* and a conveyance structure 1035. The rotating shaft 103*x* extends in a rod-like shape along the crossing direction Dw. Both end portions of the rotating shaft 103*x* are rotatably supported by the housing 101. The rotating shaft 103*x* is metallic, as an example.

The conveyance structure 1035 is formed by providing a screw 1035*a* at an outer circumferential portion of the rotating shaft 103*x*. The screw 1035*a* is resinous or metallic. The screw 1035*a* is connected to the rotating shaft 103*x* so as to be rotated along with the rotating shaft 103*x*. The conveyance structure 1035 has a recessed zone 1035*b* between screw threads 1035*a* neighboring in the crossing direction Dw. According to this configuration, weight reduction of the conveyance rotator 103E can be implemented.

Figure 15:
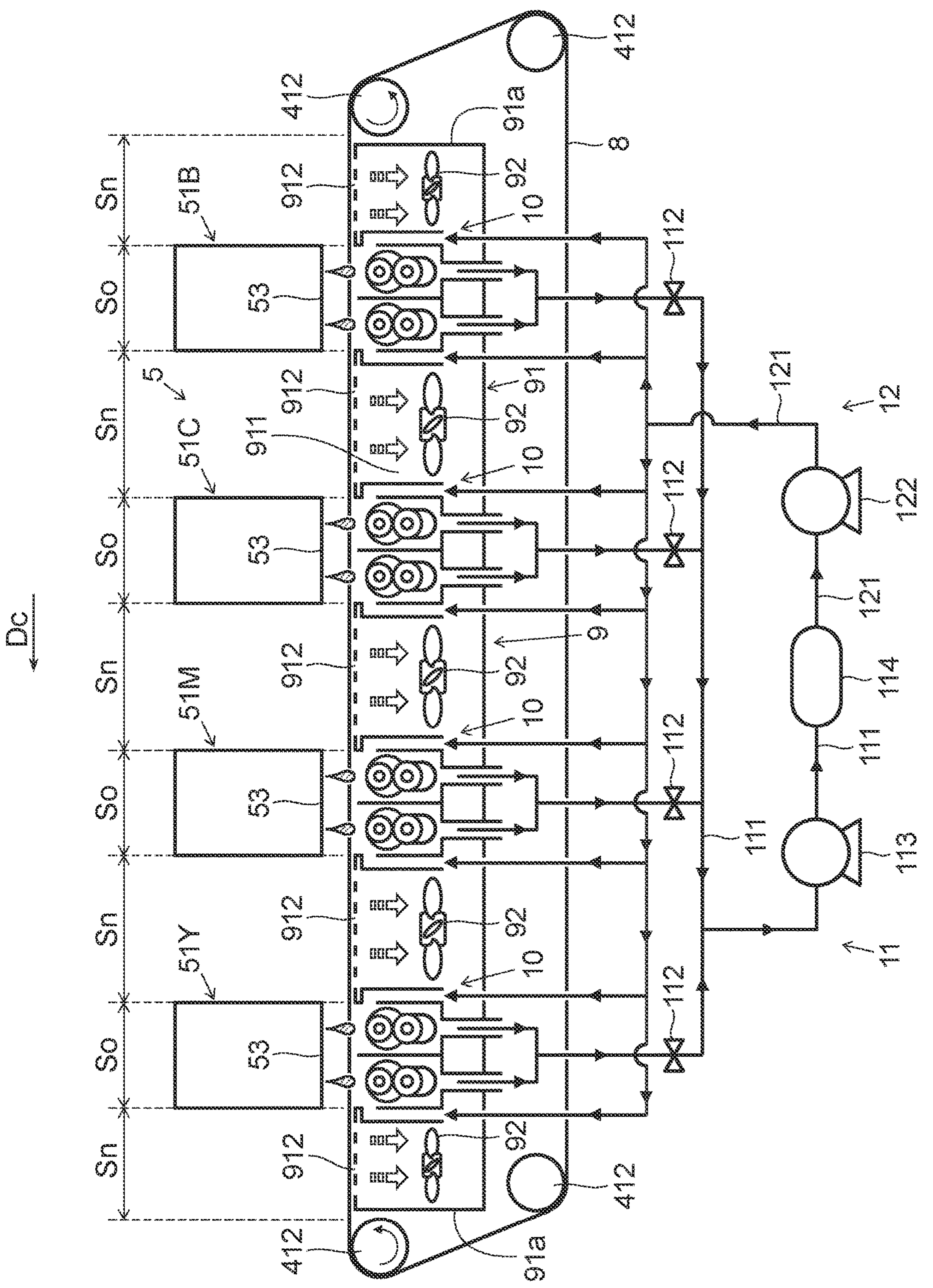
FIG. 15 is a front view of around a recording part and a first belt conveyance part according to a sixth embodiment of the disclosure.
Figure 16:
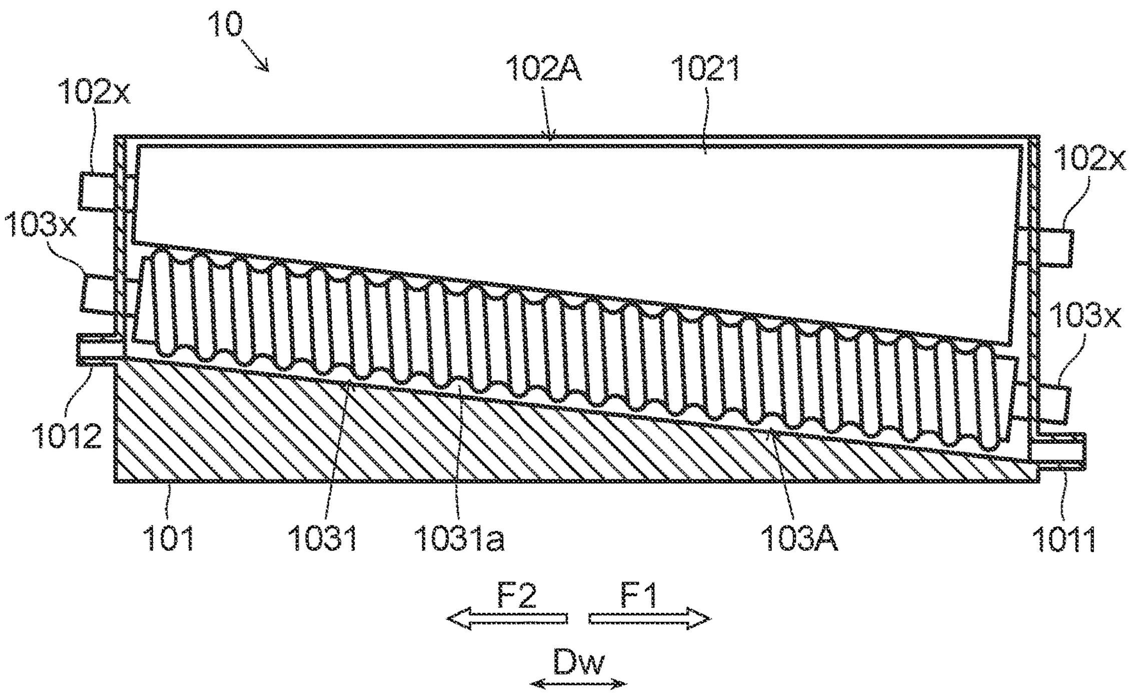
FIG. 16 is a cross-sectional side view of an ink receiving part of FIG. 15.

FIG. 15 is a front view of around a recording part 5 and a first belt conveyance part 41 according to a sixth embodiment of the disclosure. FIG. 16 is a cross-sectional side view of an ink receiving part 10 of FIG. 15. An inkjet recording apparatus 1 according to the sixth embodiment includes a liquid supply part 12 shown in FIG. 15.

The liquid supply part 12 is placed below ink receiving parts 10. The liquid supply part 12 is connected to an upstream portion of each ink receiving part 10 in the first direction F1. In addition, a housing 101 of the ink receiving part 10 has a supply port 1012 shown in FIG. 16. The supply port 1012 is placed at an end portion of the housing 101 in the crossing direction Dw in upstream portion of the first direction F1. The liquid supply part 12 is connected to the supply port 1012.

The liquid supply part 12 supplies liquid through the supply port 1012 into each ink receiving part 10. As the liquid that the liquid supply part 12 supplies into the ink receiving parts 10, available are, for example, ink, cleaning liquid for cleaning the ink ejection surfaces 53 of the recording heads 51, water, and the like.

According to this configuration, ink thickened in viscosity can be dissolved by the liquid that the liquid supply part 12 supplies into the ink receiving parts 10. Therefore, force of ink conveyance toward the discharge port 1011 can be enhanced, so that ink can be collected with even higher efficiency.

In this embodiment, for example, the liquid supply part 12 sucks up waste ink stored in the collection tank 114 and supplies the ink into the ink receiving parts 10. The liquid supply part 12 includes, for example, a liquid delivering tube 121 and a suction pump 122.

The liquid delivering tube 121 makes connections between the suction pump 122 and four ink receiving parts 10 placed below four recording heads 51, respectively. The liquid delivering tube 121 is connected to the supply ports 1012 of the ink receiving parts 10. Also, the liquid delivering tube 121 makes a connection between the collection tank 114 and the suction pump 122. Waste ink stored in the collection tank 114 circulates inside the liquid delivering tube 121.

The suction pump 122 is placed on the upstream side of a waste-ink supply direction for the ink receiving parts 10 and moreover on the downstream side of the waste-ink supply direction for the collection tank 114. The suction pump 122 sucks up the waste ink stored in the collection tank 114 and ejects the ink toward within each of the four ink receiving parts 10.

In a case where, for example, ink goes on thickening in viscosity in the ink receiving parts 10 such that ink cannot be conveyed sufficiently with the conveyance force of the conveyance rotators 103A, subsequent operations are as follows.

First, the controller 7 performs control in such fashion that liquid discharge paths within the liquid delivering tube 111 are closed by the opening/closing valves 112. The controller 7 subsequently controls the suction pump 122 to supply waste ink stored in the collection tank 114 to within each of the four ink receiving parts 10.

In addition, each ink receiving part 10 includes a liquid sensing part 105 (see FIG. 3). The liquid sensing part 105 is placed in adjacency to the ink receiving part 10, as an example. The liquid sensing part 105, including an optical-, electrostatic capacitance-, electrode-, differential pressure-, float- or other-type sensor as an example, senses a quantity of liquid or a height of liquid level stored in the ink receiving part 10. When it is sensed by the liquid sensing part 105 that a specified quantity of waste ink has been supplied into the ink receiving part 10, the controller 7 controls the suction pump 122 to stop supply of the waste ink.

In this way, the liquid supply part 12 circulates ink discharged through the discharge port 1011 outward of the ink receiving parts 10 so as to supply the ink into the ink receiving parts 10. According to this configuration, ink thickened in viscosity within the ink receiving parts 10 can be dissolved by using waste ink ejected during flashing. Therefore, force of ink conveyance within the ink receiving parts 10 can be enhanced, so that ink can be collected with even higher efficiency.

Also, the opening/closing valves 112 for opening and closing the discharge paths are provided downstream of the discharge ports 1011 in the ink discharge direction, respectively. According to this configuration, ink ejected in flashing as well as liquid supplied by the liquid supply part 12 can be stored within the ink receiving parts 10. As a result, ink thickened in viscosity within the ink receiving parts 10 can be easily dissolved.

When a specified amount of waste ink has been stored in each ink receiving part 10, the controller 7 instructs the conveyance rotator 103A to execute reverse rotation for conveying ink along a second direction F2 opposite to the first direction F1. More specifically in this connection, the conveyance rotator 103A performs forward rotation for conveying ink along the first direction F1, for example, on occasions of image recording. Meanwhile, the conveyance rotator 103A performs reverse rotation for conveying ink along the second direction F2 opposite to the first direction F1, for example, on occasions of non-image recording, turn-on of apparatus power, and turn-off of the apparatus power. In either case, the conveyance rotator 103A is stopped from rotation after an elapse of a specified time.

According to the above-described configuration, reverse rotation of the conveyance rotator 103A makes it possible to enhance a dissolving effect of thickened ink within the ink receiving parts 10. Therefore, force of ink conveyance within the ink receiving parts 10 can be enhanced, so that ink can be collected with even higher efficiency.

Also, during reverse rotation, the conveyance rotator 103A is rotated at a rotational speed higher than that of forward rotation. According to this configuration, the dissolving effect of thickened ink within the ink receiving parts 10 can be improved more than ever.

Figure 17:
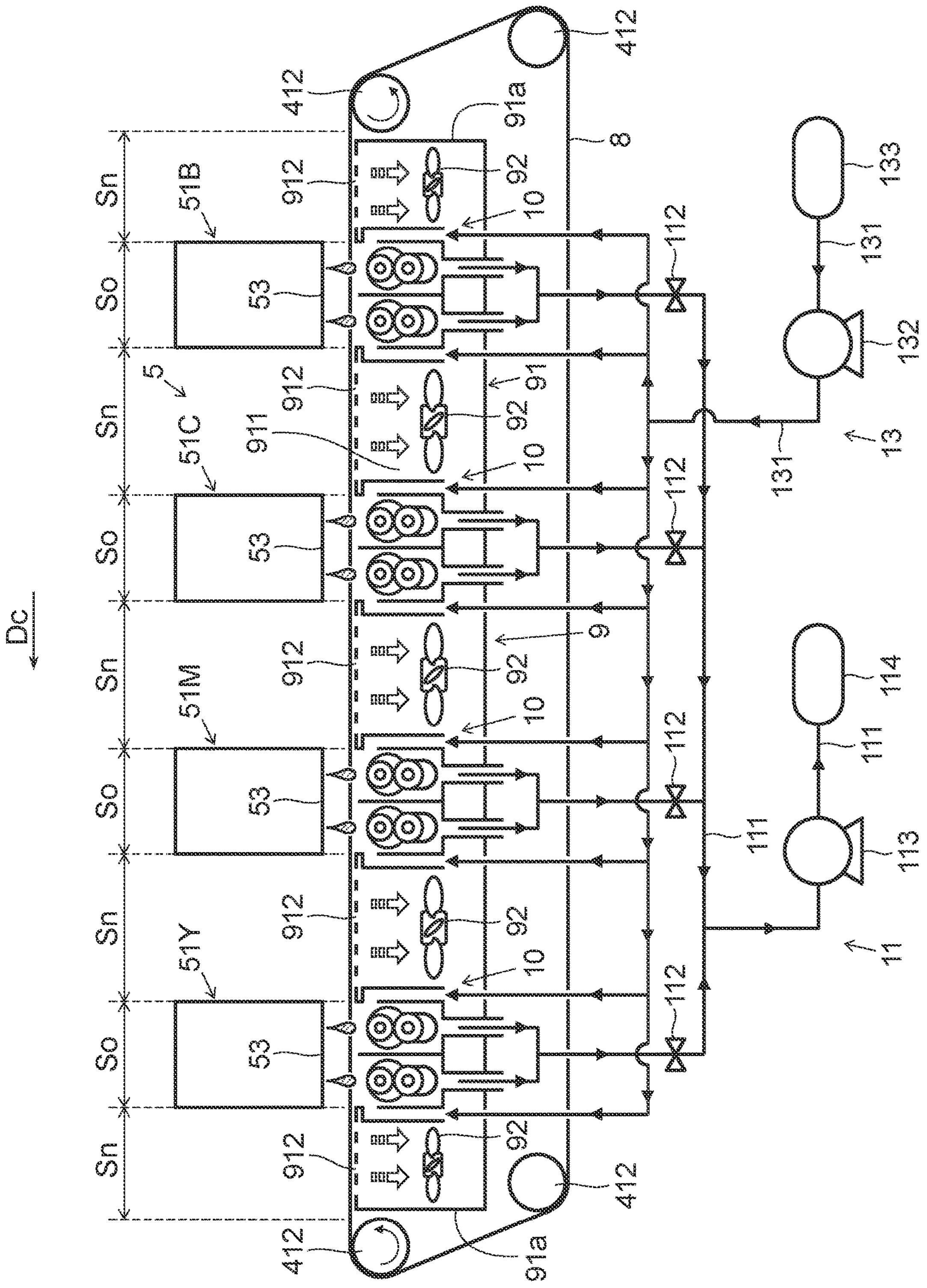
FIG. 17 is a front view of around a recording part and a first belt conveyance part according to a seventh embodiment of the disclosure.

FIG. 17 is a front view of around a recording part 5 and a first belt conveyance part 41 according to a seventh embodiment of the disclosure. An inkjet recording apparatus 1 according to the seventh embodiment includes a liquid supply part 13 shown in FIG. 17.

In this embodiment, the liquid supply part 13 sucks up cleaning liquid stored in a storage tank 133, as an example, to supply the cleaning liquid into the ink receiving parts 10. The cleaning liquid is a liquid for cleaning ink ejection surfaces 53 of the recording heads 51. The liquid supply part 13 includes, for example, a liquid delivering tube 131, a suction pump 132, and a storage tank 133.

According to the above-described configuration, a dissolving effect of thickened ink within the ink receiving parts 10 can be enhanced by supplying the cleaning liquid into the ink receiving parts 10. Therefore, force of ink conveyance within the ink receiving parts 10 can be enhanced, so that ink can be collected with even higher efficiency.

In addition, the sixth embodiment shown in FIGS. 15 and 16 and the seventh embodiment shown in FIG. 17 may be combined together. As a result of this, waste ink in the collection tank 114 as well as the cleaning liquid in the storage tank 133 can be supplied into the ink receiving parts 10.

For example, in early stages upon a beginning of use of the inkjet recording apparatus 1, since no waste ink has been collected in the collection tank 114, the cleaning liquid in the storage tank 133 is supplied into the ink receiving parts 10. After a time of some length has elapsed since the start of use of the inkjet recording apparatus 1 until waste ink has come to be collected in the collection tank 114, the supply of the cleaning liquid is stopped and waste ink in the collection tank 114 is supplied into the ink receiving parts 10. As a result of this, it becomes implementable to reduce running cost.

Although embodiments of this disclosure have been fully described hereinabove, yet the disclosure is not limited to the scope of this description and may be modified in various ways unless those modifications depart from the gist of the disclosure.

What is claimed is:

1. An inkjet recording apparatus comprising:

a recording head including a plurality of nozzles for ejecting ink;

an endless conveyor belt for conveying a recording medium to a position opposed to the recording head, the conveyor belt having a plurality of openings that allow the ink ejected from the recording head to pass therethrough; and an ink receiving part placed in opposition to the recording head via the conveyor belt so as to receive the ink that has passed through the openings during a flashing process in which the ink is ejected to the recording head at a timing different from an ejection timing of the ink toward the recording medium, wherein the ink receiving part includes a discharge port placed at an end portion of a crossing direction that crosses a recording-medium conveyance direction, the discharge port being for discharging the ink received during the flashing, and a liquid-absorptive rotator which is formed from a liquid-absorptive material and which is rotated around a rotating shaft extending along the crossing direction, and a counter member being in contact with the liquid-absorptive rotator and having a conveyance structure for conveying the ink within the ink receiving part in a carry-out direction directed toward the discharge port along an axial direction of the rotating shaft.

2. The inkjet recording apparatus according to claim 1, wherein the conveyance structure is formed from a helical recessed zone or protruded zone extending along the carry-out direction.

3. The inkjet recording apparatus according to claim 2, wherein the liquid-absorptive rotator is truncated cone shaped such that its outer form increases in diameter more and more from upstream side toward downstream side of the carry-out direction.

4. The inkjet recording apparatus according to claim 2, wherein the liquid-absorptive rotator is cylindrical shaped in outer form.

5. The inkjet recording apparatus according to claim 1, wherein an end portion of the liquid-absorptive rotator on one side closer to an ink ejection surface of the recording head is generally parallel to the ink ejection surface.

6. The inkjet recording apparatus according to claim 1, wherein the counter member is a housing which is provided in the ink receiving part to receive the ink in the flashing and rotatably support the liquid-absorptive rotator in its inside.

7. The inkjet recording apparatus according to claim 6, wherein the conveyance rotator is placed in adjacency to an inner bottom portion of the ink receiving part.

8. The inkjet recording apparatus according to claim 1, wherein the counter member is a conveyance rotator which is rotated below the liquid-absorptive rotator and which is rotated around a rotating shaft extending along the crossing direction.

9. The inkjet recording apparatus according to claim 8, wherein the conveyance rotator is truncated cone shaped such that its outer form increases in diameter more and more from upstream side toward downstream side of the carry-out direction.

10. The inkjet recording apparatus according to claim 8, wherein the conveyance rotator is cylindrical shaped in outer form.

11. The inkjet recording apparatus according to claim 8, wherein the conveyance rotator is roller shaped such that the recessed zone is helically carved at an outer circumferential portion, whereby the conveyance structure is formed.

12. The inkjet recording apparatus according to claim 8, wherein in the conveyance rotator, a wire rod is helically wound at an outer circumferential portion of the rotating shaft, whereby the conveyance structure is formed.

13. The inkjet recording apparatus according to claim 8, wherein in the conveyance rotator, a resinous or metallic screw is provided at an outer circumferential portion of the rotating shaft, whereby the conveyance structure is formed.

14. The inkjet recording apparatus according to claim 1, wherein an inner bottom portion of the ink receiving part has such an inclination as to become lower and lower from upstream side toward downstream side of the carry-out direction.

15. The inkjet recording apparatus according to claim 1, wherein the ink receiving part includes a brush member which is in contact with an outer circumferential portion of the conveyance rotator.

16. The inkjet recording apparatus according to claim 1, further comprising a liquid supply part connected to an upstream portion of the ink receiving part in the carry-out direction to supply liquid into the ink receiving part.

17. The inkjet recording apparatus according to claim 16, wherein the liquid supply part circulates the ink discharged through the discharge port outward of the ink receiving part so as to supply the ink into the ink receiving part.

18. The inkjet recording apparatus according to claim 16, wherein the liquid supply part supplies, into the ink receiving part, cleaning liquid for cleaning an ink ejection surface of the recording head.

19. The inkjet recording apparatus according to claim 1, further comprising an opening/closing valve for opening and closing a discharge path, the opening/closing valve being provided on a downstream side of the discharge port in an ink discharge direction.

20. The inkjet recording apparatus according to claim 1, wherein the conveyance rotator is rotated at a rotational speed faster than the liquid-absorptive rotator.

21. The inkjet recording apparatus according to claim 1, wherein the conveyance rotator performs forward rotation for conveying the ink along the carry-out direction on occasions of image recording, and performs reverse rotation for conveying the ink along a direction opposite to the carry-out direction on occasions of non-image recording, turn-on of apparatus power, and turn-off of the apparatus power.

22. The inkjet recording apparatus according to claim 21, wherein the conveyance rotator is rotated at a faster rotational speed in reverse rotation than in forward rotation.

* * * * *